United States Patent
Yamada

(10) Patent No.: US 9,316,305 B2
(45) Date of Patent: Apr. 19, 2016

(54) SHIFT SELECTOR

(71) Applicant: Honda Motor Co., Ltd., Tokyo (JP)

(72) Inventor: Hajime Yamada, Rancho Palos Verdes, CA (US)

(73) Assignee: Honda Motor Co., Ltd., Tokyo (JP)

(*) Notice: Subject to any disclaimer, the term of this patent is extended or adjusted under 35 U.S.C. 154(b) by 599 days.

(21) Appl. No.: 13/693,817

(22) Filed: Dec. 4, 2012

(65) Prior Publication Data

US 2014/0150590 A1   Jun. 5, 2014

(51) Int. Cl.
*F16H 59/10* (2006.01)
*F16H 59/08* (2006.01)
*F16H 63/42* (2006.01)
*F16H 59/02* (2006.01)

(52) U.S. Cl.
CPC ............. *F16H 59/10* (2013.01); *F16H 59/08* (2013.01); *F16H 63/42* (2013.01); *F16H 2059/0239* (2013.01); *F16H 2063/423* (2013.01); *Y10T 74/2014* (2015.01)

(58) Field of Classification Search
CPC .................. F16H 2063/423; F16H 63/42
See application file for complete search history.

(56) References Cited

U.S. PATENT DOCUMENTS

| | | | |
|---|---|---|---|
| 4,137,864 A | | 2/1979 | Lauper |
| 4,991,535 A | * | 2/1991 | Kobayashi et al. .......... 116/28.1 |
| 5,398,018 A | | 3/1995 | Polityka |
| 5,512,875 A | | 4/1996 | Polityka |
| 5,861,800 A | | 1/1999 | Peters et al. |
| 6,082,286 A | | 7/2000 | Kovach et al. |
| 6,439,151 B1 | | 8/2002 | Bowers et al. |
| 6,459,368 B1 | | 10/2002 | Miller et al. |
| D653,145 S | | 1/2012 | Kazyaka |
| 2008/0294317 A1 | * | 11/2008 | Cho ................................. 701/51 |
| 2010/0013621 A1 | | 1/2010 | Kazyaka |
| 2011/0025488 A1 | * | 2/2011 | Leon ............................. 340/456 |

* cited by examiner

*Primary Examiner* — Terence Boes
(74) *Attorney, Agent, or Firm* — Arent Fox LLP

(57) ABSTRACT

A shift system for a vehicle is provided that includes a shift component that facilitates shifting between gears of a transmission of the vehicle and a shift indicating component that displays a position of the shift component. The shift indicating component includes a transparent cover that facilitates a three-dimensional effect and illuminating sources that illuminate below the transparent cover adjacent to a gear indicating mark corresponding to a position of the shift component. The transparent cover provides a minor like reflection for the illuminating sources thereby providing the three-dimensional effect.

13 Claims, 7 Drawing Sheets

SHIFT SELECTOR

ORIGIN

This disclosure relates to a selector device for a vehicle and more specifically, to a transmission shift selector and transmission shift selector indicator for a vehicle.

BACKGROUND

Vehicles having automatic transmissions typically include a visual indicator to view a transmission state of a transmission shift. Typically, the visual indicator is a mechanical indicator that moves in conjunction with the transmission shift or is a light indicator that illuminates a transmission state indicia (e.g., parking (P), reverse (R), neutral (N), Drive (D), etc.), which also moves in conjunction with the physical position of the transmission shift.

A problem with these types of indicators is that the dimensions and clearances vary, such that the mechanical indicator or light indicator may not properly align with the transmission state indicia. Another problem is that the mechanical indicator may be spaced too far away from the transmission state indicia during operation of the transmission shift such that the mechanical indicator may be difficult to see. In addition, the transmission state indicator must be simplistic, economical and durable.

SUMMARY

The following presents a simplified summary of the disclosure in order to provide a basic understanding of some aspects of the disclosure. This summary is not an extensive overview of the disclosure. It is not intended to identify key/critical elements of the disclosure or to delineate the scope of the disclosure. Its sole purpose is to present some concepts of the disclosure in a simplified form as a prelude to the more detailed description that is presented later.

The disclosure provides a shift selector system for a vehicle that includes a shift component that facilitates shifting between states of a transmission of a vehicle and a shift indicating component that indicates a current state of the shift component. In aspects, the shift indicating component can include a transparent cover that can facilitate a three-dimensional effect and one or more illuminating sources that can illuminate below the transparent cover adjacent to a transmission state indicating mark corresponding to a position of the shift component, wherein the shift indicating component can provide a three-dimensional effect to the illumination adjacent to the transmission state indicating mark.

In another aspect, the disclosure provides a transmission shift assembly for a vehicle that can include a base attached to a console of the vehicle, a shift selector slidably attached to the base, and a shift indicator assembly including a transparent cover attached to a top of the base and one or more illuminating sources, wherein the one or more illuminating sources illuminate in a cavity adjacent to the shift selector corresponding to a position of the shift selector.

In yet another aspect thereof, a method of indicating a state of a transmission in a vehicle is provided that includes activating a shift component, shifting states of the transmission to a desired transmission state, activating an illuminating source adjacent to a transmission state indicating mark corresponding to the position of the shift component, and presenting an illumination of the illuminating source via a transparent domed cover in a vertical direction to provide a three-dimensional visual effect.

To the accomplishment of the foregoing and related ends, certain illustrative aspects of the disclosure are described herein in connection with the following description and the annexed drawings. These aspects are indicative, however, of but a few of the various ways in which the principles of the disclosure can be employed and the subject disclosure is intended to include all such aspects and their equivalents. Other advantages and novel features of the disclosure will become apparent from the following detailed description of the disclosure when considered in conjunction with the drawings.

DETAILED DESCRIPTION

Figure 1:
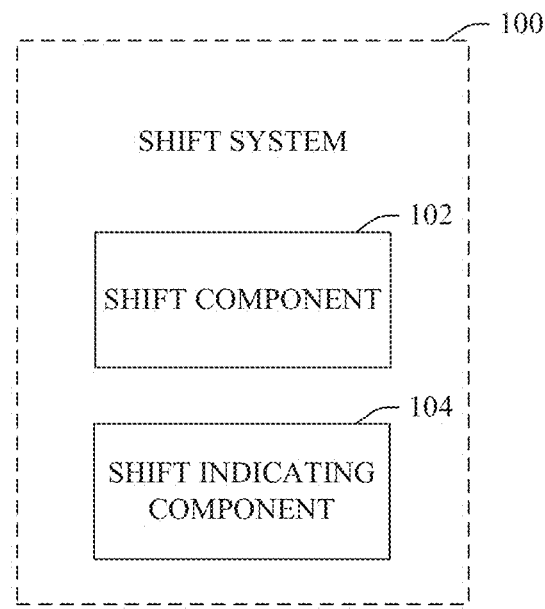
FIG. 1 is a block diagram illustration of a shift system in accordance with an aspect of the disclosure.

The disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the disclosure can be practiced without these specific details. In other instances, well-known structures and devices are shown in block diagram form in order to facilitate describing the disclosure.

While, for purposes of simplicity of explanation, the one or more methodologies shown herein, e.g., in the form of a flow chart, are shown and described as a series of acts, it is to be understood and appreciated that the subject disclosure is not limited by the order of acts, as some acts may, in accordance with the disclosure, occur in a different order and/or concurrently with other acts from that shown and described herein. Moreover, not all illustrated acts may be required to implement a methodology in accordance with the disclosure.

The disclosure described herein discloses a system and method of illuminating an indicator of a state of a transmission of a vehicle that incorporates the use of one or more illuminating sources that illuminate a state of each of the parking-reverse-neutral-drive (P-R-N-D) etc. (e.g., including individual gears, etc.) transmission states (collectively "states"). In certain aspects, the P-R-N-D indicia can be printed upon, otherwise embedded within, or covered by a transparent material where the transparent material is domed or rounded, and, in some aspects, can provide a minor-like reflection that facilitates a three-dimensional effect; in other aspects, this effect can be provided as described elsewhere herein. Thus, when a shift selector of the system is positioned at a specific transmission state, the illuminating source for that gear is not only illuminated, but can also be reflected as described herein to provide the three-dimensional effect, thereby identifying the selected transmission state. The illuminating sources may be any type of light source, such as but not limited to, light emitting diodes (LEDs), incandescent bulbs, etc. In addition, the illuminating sources can be adapted to change color based on the state selected, a customer preference received via a personalization component, etc. It is to be appreciated that the example embodiments disclosed herein are for illustrative purposes only and are not intended to limit the scope of the disclosure.

Referring now to the drawings, FIG. 1 is an illustration of a shift system 100 for an automotive vehicle incorporating the novel features described below in accordance with an aspect of the disclosure. The shift system 100 can include a shift component 102 and a shift indicating component 104.

The shift component 102 is configured to allow an operator of the vehicle to shift between the states of a transmission of the vehicle. The shift component 100 includes a shift selector assembly (e.g., handle, lever, etc.) and is configured to communicate either mechanically, electrically, or a combination thereof with the transmission. Thus, the shift component 102 may be a mechanical type shifter, an electronic type shifter, or an electromechanical type shifter.

For example, in one embodiment, the shift component 102 may include a handle or lever that is slidably operated to shift from one transmission state to another. In another embodiment, the shift component 102 may include a handle or lever that has a toggle switch, pivot, etc. where the operator simply toggles, etc. the handle or lever in one direction or another to switch between states of the transmission (e.g., between individual gears). In yet another embodiment, the shift component 102 may include a touch system that may have a touch pad or screen, where the operator simply touches the pad or screen to shift between the desired states. Further, the touch system may be configured such that the operator simply touches a state indicator that corresponds to the desired transmission state. In still yet another embodiment, the shift component 102 may include a voice actuated system that communicates with a vehicle's on board computer such that the operator simply uses voice commands to shift between desired states.

The shift indicating component 104 is configured to provide the operator a visual indication of the state selected by the shift component 104. As will be explained further below, the shift indicating component 104 may include a shift indication assembly that has a transparent cover, illuminating sources, and transmission state indicators. As explained further herein, a three-dimensional effect can be provided in a variety of ways. The one or more illuminating sources may include such sources as but not limited to LED's, incandescent bulbs, etc. In addition, the shift indicating component 104 may include a collimator to align the illumination of the light sources in both a horizontal and/or a vertical direction.

Figure 2:
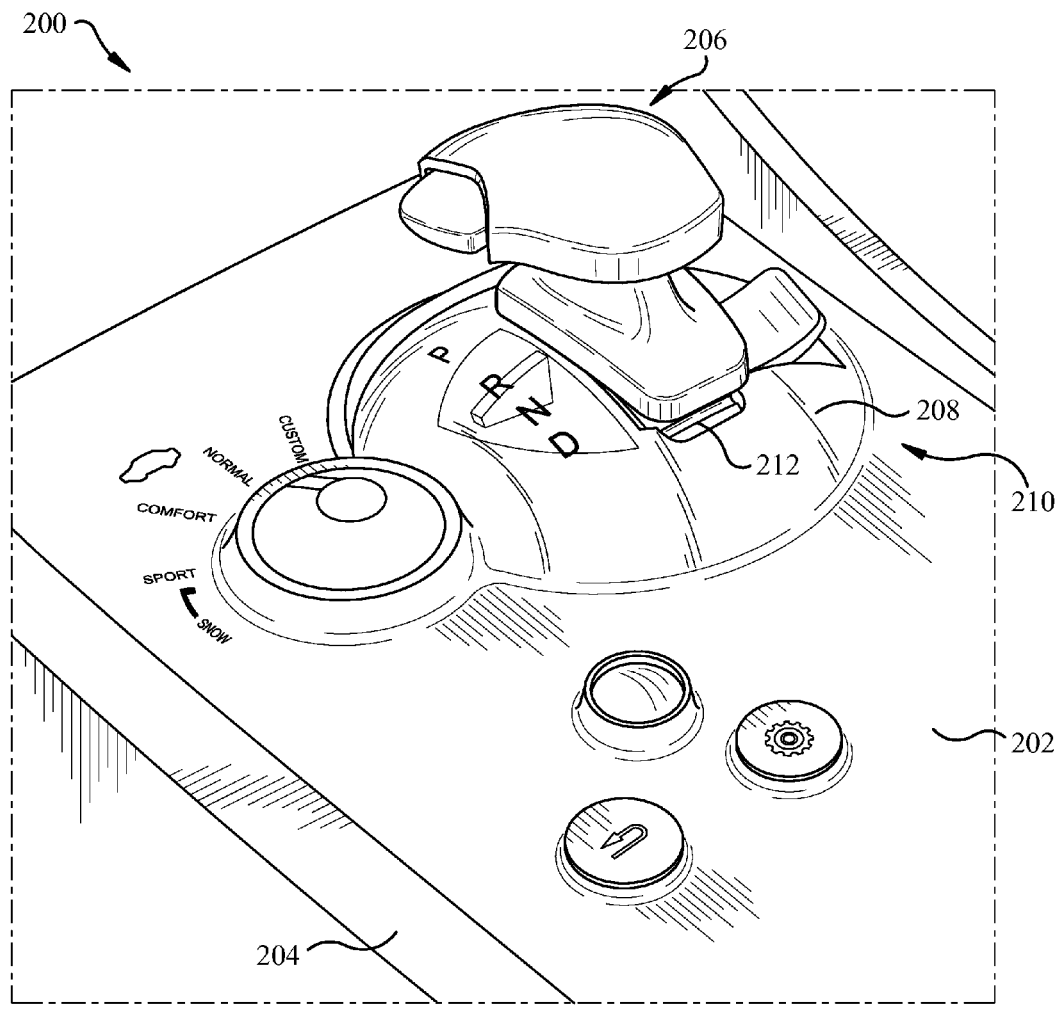
FIG. 2 is a perspective view of a shift assembly in accordance with an aspect of the disclosure.

FIGS. 2-5 illustrate an example embodiment of a shift assembly 200 for a vehicle in accordance with an aspect of the disclosure. Referring specifically to FIG. 2, the shift assembly 200 includes a base 202 attached to a top of a console 204 of the vehicle, a shift selector assembly 206 slidably attached to a base domed or rounded portion 208 of the base 202, and a shift indicator assembly 210. An opening 212 is defined in the base domed portion 208 of the base 202 adjacent to the shift selector 206. The shift selector assembly 206 and the shift indicator assembly 210 illustrated in FIG. 2 is but one example configuration adapted to conform to the shift system 100 described above and illustrated in FIG. 1. Thus, it is to be understood that the example embodiment described herein and illustrated in FIGS. 2-5 is for illustrative purposes only and is not intended to limit the scope of the disclosure.

Figure 3:
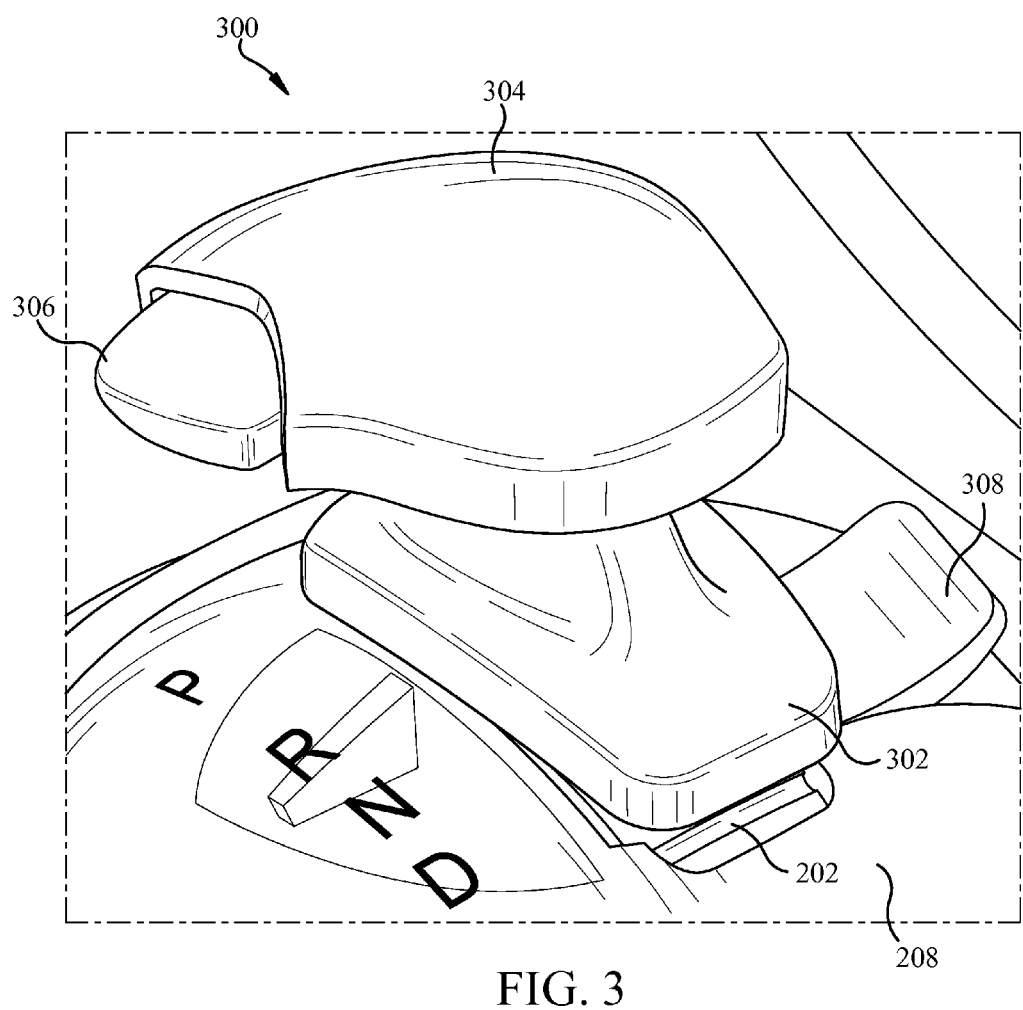
FIG. 3 is a close-up perspective view of a shift selector assembly in accordance with an aspect of the disclosure.

Referring to FIG. 3, the example shift selector 206 includes a selector base 302 that slides along the base domed portion 208 of the base 202, a grip portion (handle) 304 attached to a top of the selector base 302, a movable switch 306 disposed in a side of the grip portion 304, and a parking switch 310. The operator depresses the movable switch 306 to disengage the shift selector 206 and slide it to a desired state position. A parking switch 310 can be disposed on a side of the base domed portion 208 and can activate and deactivate an emergency parking brake. It is to be understood that although the disclosure is described in connection with this example shift selector 206, substantially any shift selector can be used in connection with the disclosure.

Figure 4:
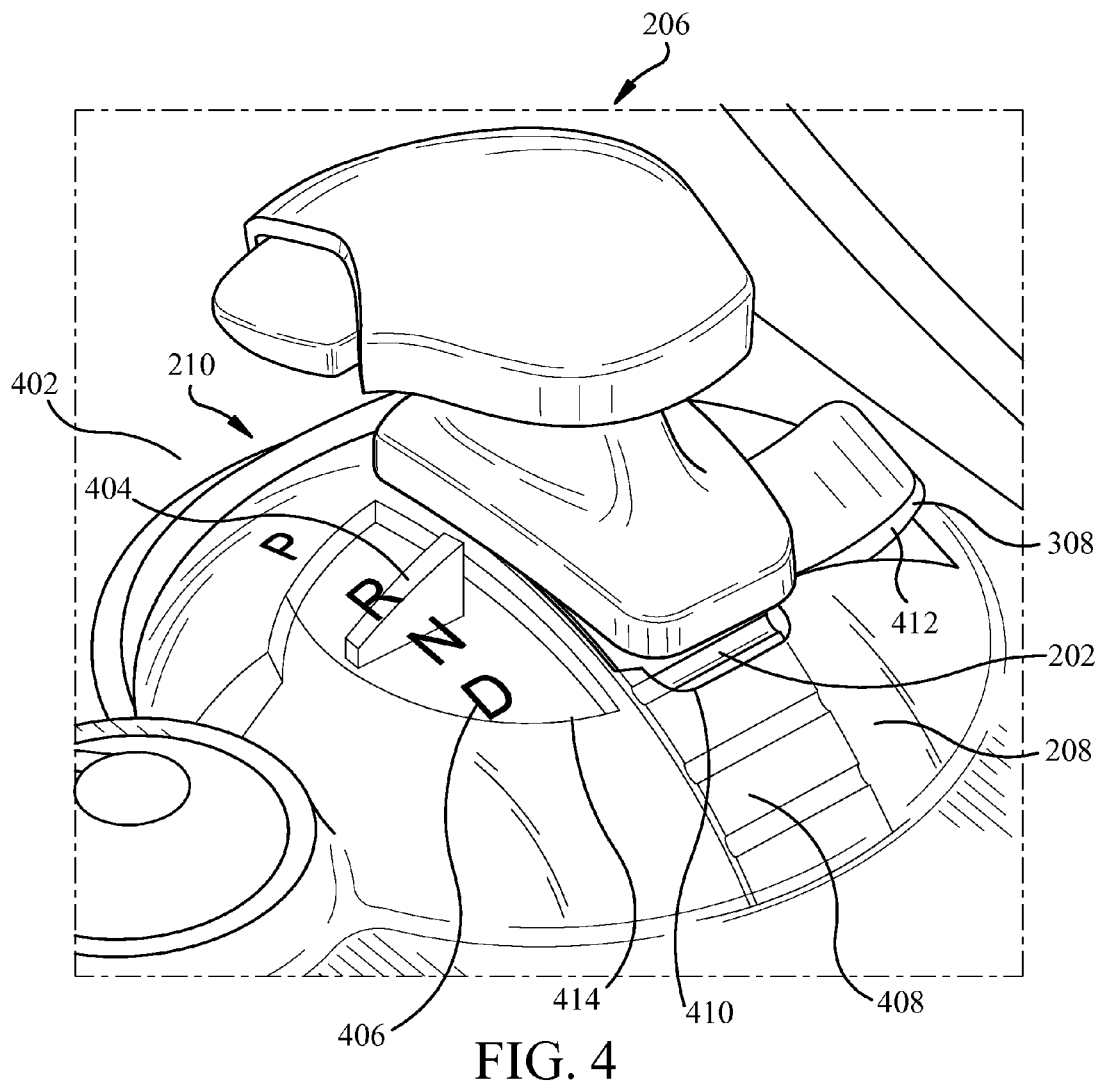
FIG. 4 is a close-up perspective view of a shift indicating assembly in accordance with an aspect of the disclosure.

Referring to FIG. 4, the shift indicator assembly 210 includes a transparent cover 402 attached to a top of the base 202, illuminating sources 404, and state indicators 406 (i.e., P-R-N-D) disposed on a top portion of the transparent cover 402. The transparent cover 402 includes a cover domed or rounded portion 408 that conforms to the shape of the base domed portion 208 of the base 202. In addition, the cover domed portion 408 transparently covers the opening 212 described above. A first opening 410 can be defined in a top part of the domed portion 408 of the transparent cover 402 that facilitates a sliding movement of the shift selector 206 described above. A second opening 412 is defined in a side of the cover domed portion 408 and is adapted to receive the parking switch 308 described above.

Figure 5:
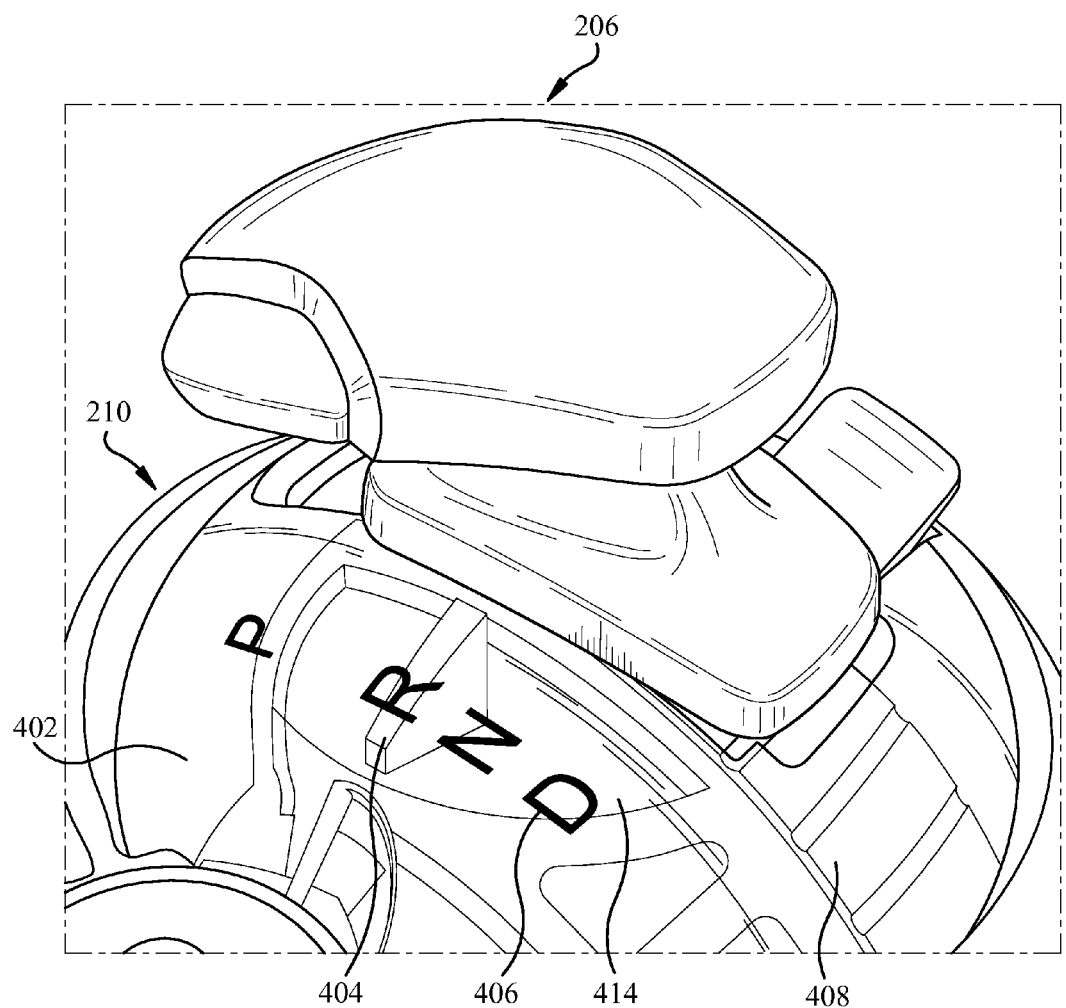
FIG. 5 is a close-up perspective view of another embodiment of a shift indicating assembly in accordance with an aspect of the disclosure.

During operation, the one or more illuminating sources 404 illuminate in a cavity 414 defined adjacent to the shift selector 206 corresponding to a position of the shift selector 206. In the example embodiment illustrated in FIGS. 2-5, the cover domed portion 408 reflects light from the one or more illumination sources 404 in a vertical direction to provide a three-dimensional visual effect within the cavity 414 as described herein. In addition, light from the illumination sources 404 extends in a horizontal direction across the cavity 414. In one embodiment, the light from the one or more illumination sources 404 is configured to illuminate in a different color based on a position of the shift selector 206. For example, the embodiment illustrated in FIG. 4 shows the illuminating source 404 illuminating in a red color. On the other hand, the example embodiment illustrated in FIG. 5 shows the illuminating source 404 illuminating in a green color. It is to be appreciated that these colors are arbitrary and thus, are for illustrative purposes only and are not intended to limit the scope of the disclosure.

In yet another embodiment, the illuminating sources 404 are configured to provide an illumination in a different color based on operator choice, whereby the operator provides a color input to the vehicle's on board computer, actuates a button or switch, etc. In other words, the operator can customize or personalize a different color for each gear. In addition, the operator can change the color of one of more gears at random (e.g., from day-to-day, week-to-week, etc.).

Figure 6:
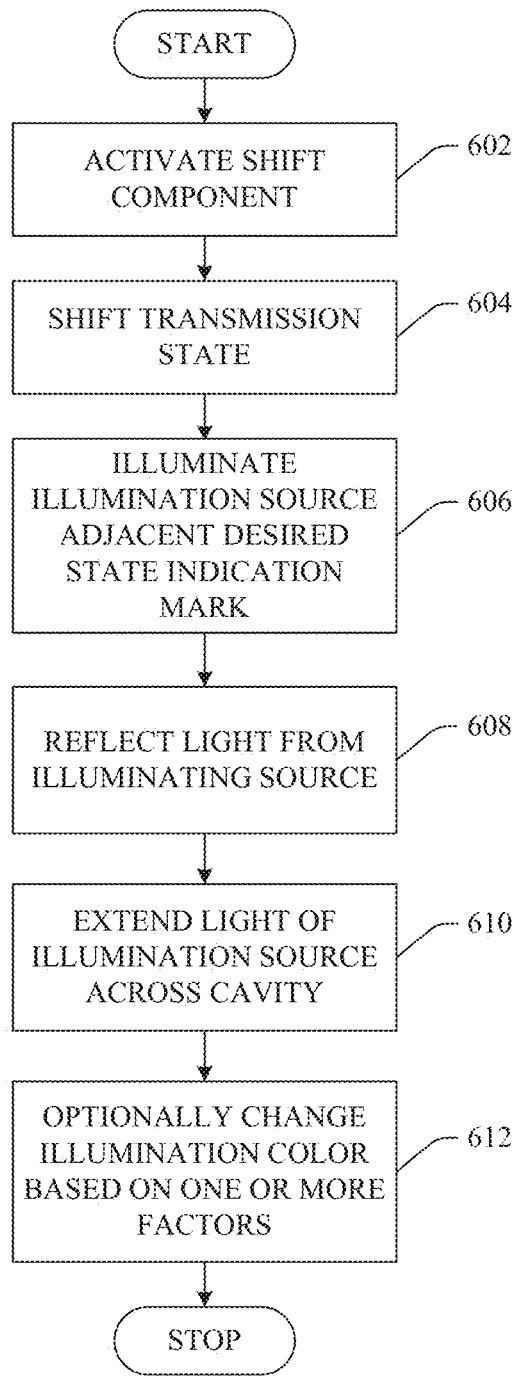
FIG. 6 is a flow chart diagram illustrating a method of providing a three-dimensional effect for transmission gear indication based on a shifting of gears of the transmission in accordance with an aspect of the disclosure.

Referring to FIG. 6, a method of providing a three-dimensional effect for transmission state indication based on a shifting of states of the transmission will now be described in accordance with an aspect of the disclosure. At 602, the shift component 206 described above is activated. At 604, the state of the transmission is shifted to a desired transmission state. At 606, one of the one or more illuminating sources 404 is illuminated adjacent to the state indicating mark 406 corresponding to a position of the shift component 206. At 608, light from the illuminated illuminating source 404 is reflected in a vertical direction via the transparent cover 402 to provide a three-dimensional visual effect, as described herein. At 610, the light or illumination of the illuminating source 404 is extended in a horizontal direction across the cavity 414 defined adjacent to the shift component 300. At 612, a color of the light or illumination of the illuminating source 404 is changed based on one or more factors. These factors can include a position of the shift component, operator choice (e.g., whereby the operator provides a color input to the vehicle's on board computer, etc.), etc.

Figure 7:
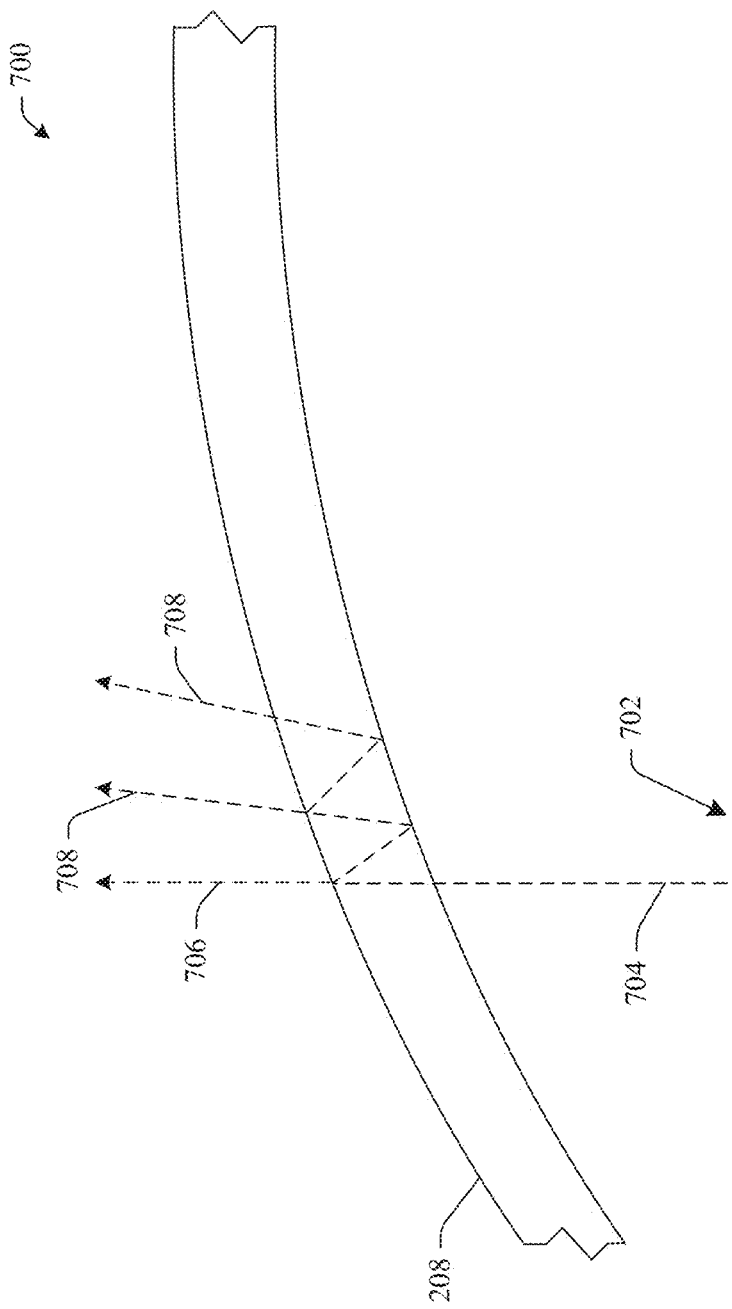
FIG. 7 illustrates a cross-sectional view of a transparent dome, indicating one potential embodiment capable of providing a three-dimensional effect such as discussed herein.

FIG. 7 illustrates a cross-sectional view of a transparent dome, indicating one potential embodiment capable of providing a three-dimensional effect such as discussed herein. As shown in FIG. 7, an illumination source 702 (e.g., direct or indirect, such as reflected, etc.) can provide light 704 that can pass through a transparent base domed portion 208, with at least a portion of the light 704 emerging as transmitted light 706 (for simplicity of illustration, although refraction would occur at the bottom and top surfaces of base domed portion 208, this is not illustrated in FIG. 7). However, at least a portion of the light 704 can be internally reflected one or more times in a minor-like manner (some internal reflection occurs when light passes at an angle from a material with a higher index of refraction to a material with a lower index of refraction), with portions of the reflected light emerging as one or more additional images 708. The presence of these additional images 708 can provide depth, giving a three-dimensional effect to an image of a horizontal shape, etc., such as illustrated in FIGS. 2-5. For example, in various aspects, a two-dimensional pattern can be generated (e.g., a stripe, bar, circle, etc.), which, in conjunction with the additional images 708 discussed herein, can provide the three-dimensional effect. In alternate embodiments, a three-dimensional effect can be provided in one or more different ways, such as by illuminating a three-dimensional block, wedge, etc. that light diffuses throughout, etc.

As mentioned above, the disclosure discloses a system and method for enhancing a three-dimensional effect for viewing a transmission gear indicator. As described herein, a transparent cover is domed or rounded and provides a minor like reflection that facilitates a three-dimensional effect when a shift selector of the system is positioned at a specific gear.

What has been described above includes examples of the disclosure. It is, of course, not possible to describe every conceivable combination of components or methodologies for purposes of describing the subject disclosure, but one of ordinary skill in the art may recognize that many further combinations and permutations of the disclosure are possible. Accordingly, the disclosure is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A shift system for a vehicle comprising:
   a shift component that facilitates shifting between gears of a transmission of the vehicle; and
   a shift indicating component that displays a position of the shift component, the shift indicating component including:
      a transparent cover having a top surface and a bottom surface that facilitates a three-dimensional effect; and
      one or more illuminating sources that generate a pattern below the transparent cover adjacent to a gear indicating mark corresponding to a position of the shift component,
   wherein a portion of light from the one or more illuminated sources is transmitted through the transparent cover and a portion of the light is internally reflected off the top and bottom surfaces of the transparent cover thereby generating a plurality of images, and
   wherein the transparent cover provides the generated plurality of images creating the generated pattern, thereby providing the three-dimensional effect.

2. The shift system of claim 1, wherein a portion of the transparent cover has a domed shape.

3. The shift system of claim 2, wherein the domed shape portion of the cover reflects the pattern between the top surface and the bottom surface of the domed shaped portion to provide a three-dimensional effect.

4. The shift system of claim 3, wherein the one or more illuminating sources include one or more light emitting diodes.

5. The shift system of claim 1, wherein the shift component includes a handle slidably movable along a base attached to a console of the vehicle.

6. The shift system of claim 1, wherein the shift component includes a lever that toggles in at least one direction to shift between the gears of the transmission.

7. A transmission shift assembly for a vehicle comprising:
   a base attached to a console of the vehicle;
   a shift selector slidably attached to the base; and
   a shift indicator assembly including a transparent cover having a top surface and a bottom surface that facilitates a three-dimensional effect and attached to a top of the base and one or more illumination sources,
   wherein the one or more illumination sources generate an indicator in a cavity adjacent to the shift selector corresponding to a position of the shift selector, and
   wherein a portion of light from the one or more illumination sources is transmitted through the transparent cover and a portion of the light is internally reflected off the top and bottom surfaces of the transparent cover thereby generating a plurality of images; and
   wherein the transparent cover provides the generated plurality of images, thereby providing the three-dimensional effect.

8. The transmission shift assembly of claim 7, wherein the transparent cover includes a dome portion that encompasses the cavity and reflects an image of the indicator one or more times to provide the three-dimensional visual effect.

9. The transmission shift assembly of claim 8, wherein the indicator extends in a horizontal direction across the cavity.

10. The transmission shift assembly of claim 7, wherein the one or more illumination sources includes one or more light emitting diodes.

11. The transmission shift assembly of claim 7, wherein the one or more illumination sources are configured to generate the indicator in a different color based on a position of the shift selector.

12. The transmission shift assembly of claim 7, wherein the one or more illumination sources are configured to illuminate in a different color based on operator input.

13. The transmission shift assembly of claim 7, wherein the shift selector is one of a slidable handle or a toggle lever.

* * * * *